United States Patent [19]
Becnel

[11] Patent Number: 5,857,246
[45] Date of Patent: Jan. 12, 1999

[54] LIQUID ACTIVATED BUCKLE RELEASE MECHANISM

[75] Inventor: Steven A. Becnel, Belle Chasse, La.

[73] Assignee: Stratus Systems, Inc., New Orleans, La.

[21] Appl. No.: 467,924

[22] Filed: Jun. 6, 1995

[51] Int. Cl.[6] ................................................. A44B 11/25
[52] U.S. Cl. ................................................. 24/602; 24/603
[58] Field of Search .......................... 24/602, 603, 631, 24/632, 573.6; 297/468, 483

[56] References Cited

U.S. PATENT DOCUMENTS

| | | | |
|---|---|---|---|
| 2,899,732 | 8/1959 | Cushman | 24/632 |
| 3,967,797 | 7/1976 | Drew | 24/603 X |
| 3,994,049 | 11/1976 | Johansen et al. | 24/602 |
| 4,589,172 | 5/1986 | Hoenigs et al. | 24/602 |

FOREIGN PATENT DOCUMENTS

| | | | |
|---|---|---|---|
| 686192 | 1/1953 | United Kingdom | 24/631 |

*Primary Examiner*—James R. Brittain
*Attorney, Agent, or Firm*—Banner & Witcoff, Ltd.

[57] ABSTRACT

The present invention is directed to a liquid activated buckle release mechanism for safety belt harnesses and restraint devices used in moving crafts such as airplanes, boats, land based vehicles and the like. The buckle includes a latch for receiving and retaining one end of a safety belt within the buckle, a release mechanism for releasing the latch in order to free the belt, a liquid detection circuit for detecting the presence of liquid and controlling the operation of the release mechanism when liquid is detected.

9 Claims, 7 Drawing Sheets

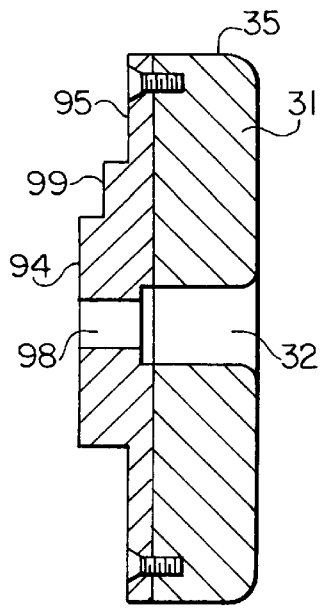
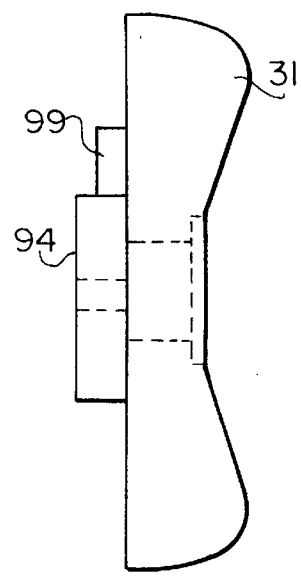
FIG. 11  FIG. 12
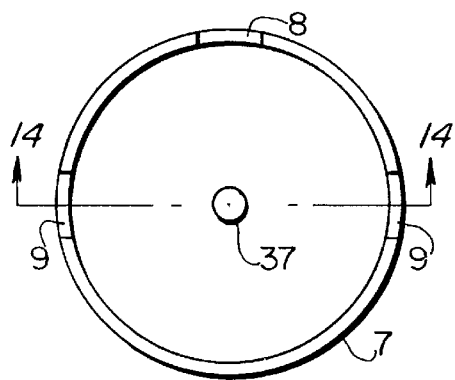
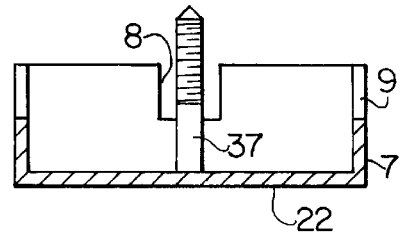
FIG. 13  FIG. 14
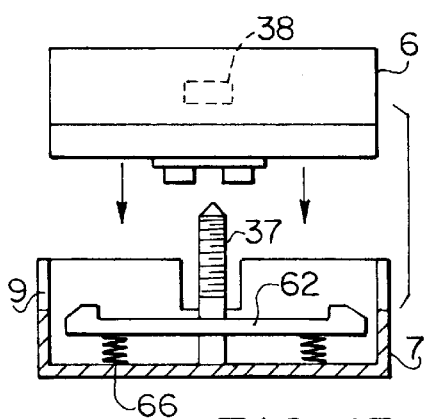
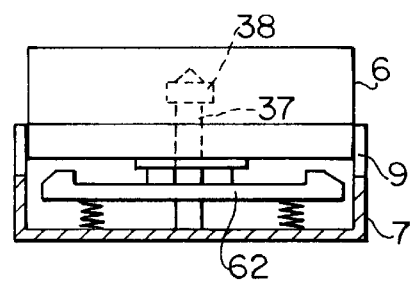
FIG. 15  FIG. 16

LIQUID ACTIVATED BUCKLE RELEASE MECHANISM

BACKGROUND OF THE INVENTION

The present invention generally relates to the field of liquid-sensitive actuators for actuating a device upon immersion in a liquid. More particularly, the present invention is directed to a liquid activated buckle release mechanism for safety belt harnesses and restraint devices used in moving crafts such as airplanes, boats, land based vehicles and the like.

At the present time, approximately 90% of all military and civilian helicopter restraint devices employ a seat harness with a rotary buckle mechanism as illustrated in FIG. 1. As FIG. 1 shows, a seat strap 1 is routed between the crew member or passenger's legs. One end of strap 1 is bolted to the seat pan on which the crew member sits and the other end is attached to a rotary buckle 4. Shoulder straps 2 and lap belt straps 3 are inserted into rotary buckle 4 and are locked into place. In order to release straps 2 and 3 from buckle 4 so that the crewman can egress the aircraft, the crew member must rotate a buckle release handle 5.

When a crash of the aircraft or ditching in water occurs, the helicopter will, in most cases, roll over to an inverted position and sink. The ingress of water and the panic of the crew member makes it difficult to locate and operate release handle 5 to free himself from the seat harness and perform an emergency egress maneuver. In many instances, the crew member is trapped and drowns. The crew member may also be unconscious or too injured as a result of the crash to operate the release handle. Thus, a crew mate will not only have to locate and operate the release handle for his own harness, he must also locate and operate the release handle for the injured crewman as well. The time lost in doing so further endangers the lives of all involved.

Water craft also represent another cause for concern with respect to rapid release of safety belts and restraint devices in the event of an emergency. The concern is particularly great with respect to motor boats. In an accident where the boat capsizes or loses its structural integrity, those on board must quickly release themselves from any restraint systems. As in the case of the downed crewmen in the helicopter discussed above, they may be unable to do so with out the assistance of others.

There are many other circumstances in which life-saving restraint devices can become a danger to life. Even the safety-belt in a typical automobile can be difficult to unbuckle during an emergency. The need for an automatic release of the buckle is particularly desirable where there is heavy vehicle traffic around large bodies of water such as lakes, rivers, ponds and the like. Occupants of a vehicle which accidentally plunges into these bodies of water are confronted with the some dangers described above with respect to crewman in aircraft. Moreover, infants who are buckled into child safety seats are particularly at risk in these situations.

Accordingly, there is a great need for a buckle release mechanism which can be manually and automatically operated in an emergency situation.

SUMMARY OF THE PRESENT INVENTION

Accordingly, it is an object of the present invention to obviate the above-noted shortcomings and disadvantages of manual release buckles known in the prior art. The present invention provides a compact and reliable liquid-sensitive release mechanism which releases the buckle automatically in response to immersion in liquid.

Another object of the present invention is to provide such a release mechanism which is sensitive to immersion in many different types of liquids.

Another object of the present invention is to provide such a release mechanism which will actuate only upon immersion in a liquid so that premature and unwanted actuation is prevented.

Another object of the present invention is to provide such a release mechanism which can be easily and inexpensively reconditioned for reuse.

Another object of the present invention is to provide such a release mechanism which is not adversely affected by extraneous electromagnetic radiation.

The above described objects of the present invention are achieved with a liquid-sensitive safety belt buckle which includes a latch for receiving and retaining one end of a safety belt within the buckle, a release mechanism for releasing the latch in order to free the belt, a control device for controlling the operation of the release mechanism and a liquid detection device for detecting the presence of liquid and providing a corresponding control signal to the control device when the liquid is present. The control device operates the release mechanism in response to the control signal.

BRIEF DESCRIPTION OF THE DRAWINGS

The novel features of the present invention are set out with particularity in the appended claims, but the invention will be understood more fully and clearly from the following detailed description of the invention as set forth in the accompanying drawings, in which:

FIG. 11 is a cross-sectional view of the cam and cam housing which forms the cam unit of the present invention;

FIG. 12 is a side view of another embodiment of the cam and cam housing which forms the cam unit of the present invention;

FIG. 13 is a top view of the lower housing of the automatic release buckle of the present invention;

FIG. 14 is a side view of the lower housing of the automatic release buckle of the present invention;

FIGS. 15 and 16 illustrate the mating of the cam unit to the lower housing of the automatic release buckle of the present invention;

DESCRIPTION OF THE PREFERRED EMBODIMENT

A preferred embodiment of the present invention will now be described with reference to the accompanying drawing.

Figure 1:
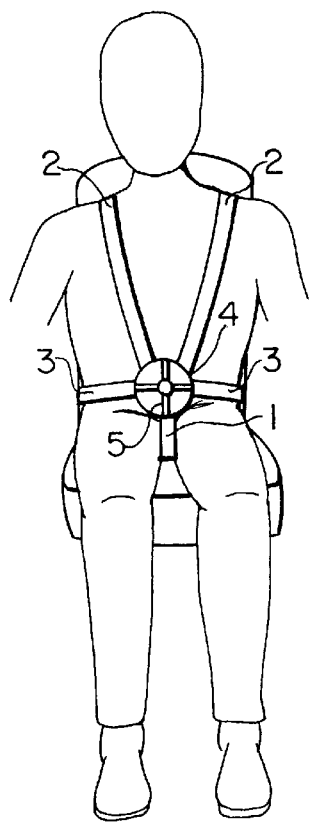
FIG. 1 illustrates a person strapped into a seat with a safety restraint harness.
Figure 2:
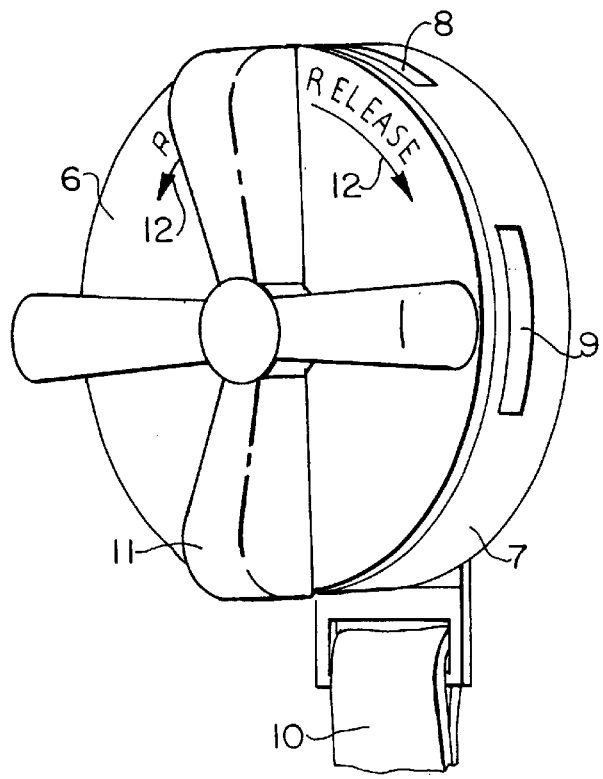
FIG. 2 illustrates a rotary buckle for releasing the belts of a safety restraint harness.

FIG. 2 illustrates the exterior of a rotary buckle which includes the liquid activated release mechanism of Applicant's invention. The buckle includes a rotary cam unit 6 and a lower housing 7. In this embodiment, lower housing 7 includes a plurality of slots for receiving straps or belts for strapping a person into a seat as discussed above with reference to FIG. 1. Only slots 8 for receiving a right side shoulder belt and slot 9 for receiving a right side lap belt are visible in FIG. 2. Also shown in FIG. 2 is seat belt 10 attached to lower housing 7 and a rotary release handle 11 attached to cam unit 6 for manually releasing the belts. Rotary release handle 11 can be turned in both a clockwise and a counter-clockwise direction, as indicated by arrows 12, in order to release all of the belts.

As discussed below, many of the various elements of the present invention are described as being fabricated from metal, such as aluminum. The use of metal is for purposes of example only. The elements may also be fabricated in other ways and from other materials such as die casting or molding from plastic materials of suitable strength and wearability. The various elements also are described with respect to certain dimensions. These dimensions also are for example purposes only and the invention is not limited thereto. In addition, the same reference numbers in the various figures refer to the same elements.

Figure 3:
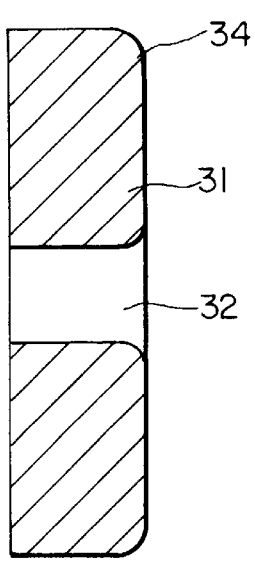
FIG. 3 is a cross-sectional view of the cam housing for the cam unit of the present invention as shown in FIG. 4.
Figure 4:
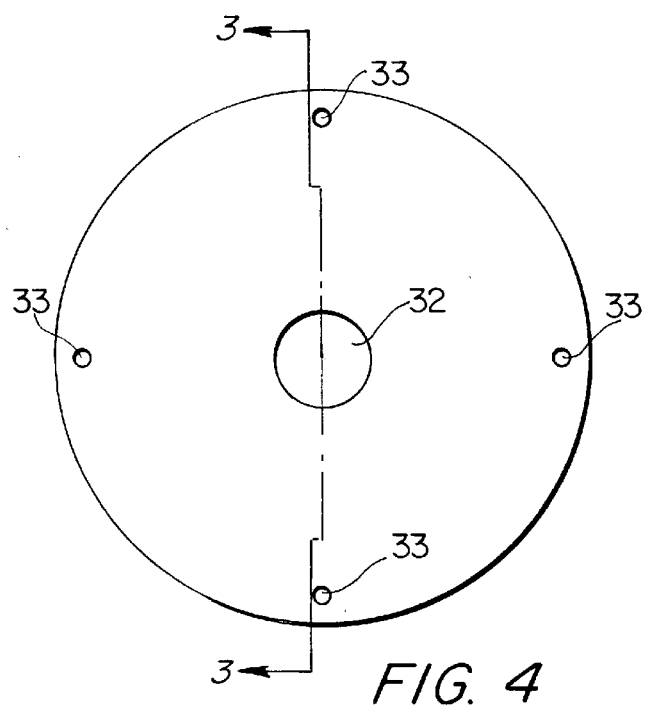
FIG. 4 is a bottom view of the cam housing for the cam unit of the present invention.
Figure 5:
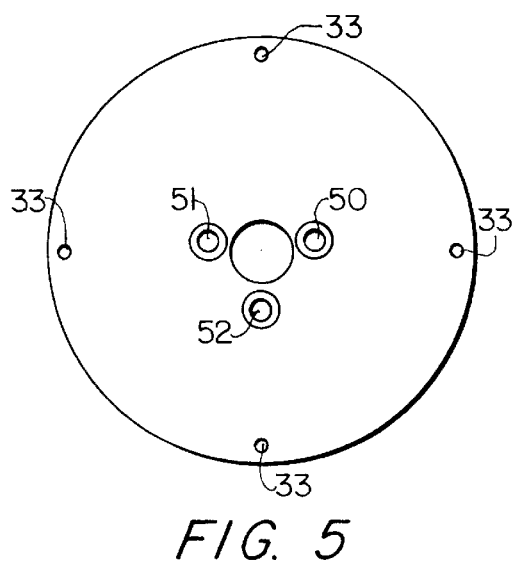
FIG. 5 is a bottom view of the cam housing for the cam unit of the present invention showing a plurality of holes for the cam action of the cam unit.

As shown in FIGS. 3 through 11, cam unit 6 is formed of a cam housing 31 and a cam 95. Cam housing 31 is fabricated from an aluminum block. The fabrication process begins by machining the aluminum block to a generally rounded shape, as shown in FIG. 4, with a diameter of approximately 2.75 inches and a thickness of approximately 0.5 inches. FIG. 4 is a bottom view of cam housing 31 (in relation to its assembly with lower housing 7) while FIG. 3 is a cross-sectional view.

Cam housing 31 contains a center bore 32 of approximately 0.5 inches diameter and a plurality of screw holes 33. Screw holes 33 can be drilled and tapped to receive, for example, 4–40 bevel head screws having a length of 0.250 inches. Edge 34 of cam housing 31 may also be machined to have a radius of approximately 0.125 inches.

Figure 9:
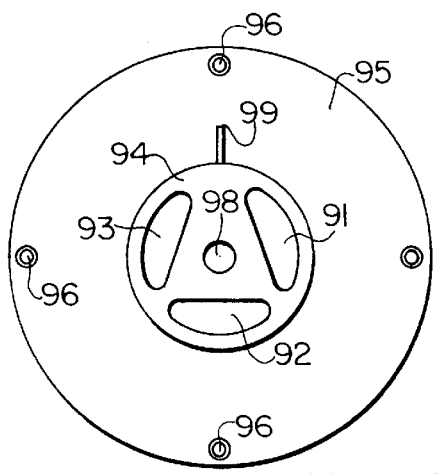
FIG. 9 is a bottom view of the cam for the cam unit of the present invention.
Figure 10:
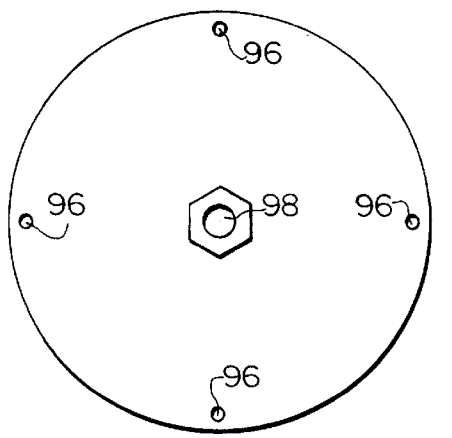
FIG. 10 is a top view of the cam for the cam unit of the present invention.

Cam 95 is illustrated in FIGS. 9 and FIG. 10. FIG. 9 is a bottom view and FIG. 10 is a top view of cam 95 (in relation to its assembly with lower housing 7). Cam 95 may also be formed from aluminum and is generally rounded in shape as shown in FIGS. 9 and 10 with the same approximate diameter as cam housing 31 and has a thickness of approximately 0.125 inches.

Cam 95 includes raised hub 94 in which three ball track grooves 91, 92 and 93 are formed in a crescent configuration. The height of hub 94 is approximately 0.250 inches. Cam 95 also includes a bore 98 and a plurality of screw holes 96 which correspond to screw holes 33 in cam housing 31. Using these holes, cam 95 can be mated to cam housing 31 using appropriate screws as discussed above and as illustrated in FIG. 11. FIG. 11 is a cross-sectional view of cam 95 and cam housing 11.

Figure 8:
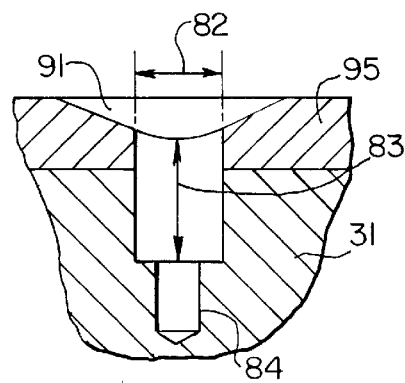
FIG. 8 is a cross-sectional view of the cam holes and ball tracks formed in the cam and cam housing in accordance with the present invention.
Figure 25:
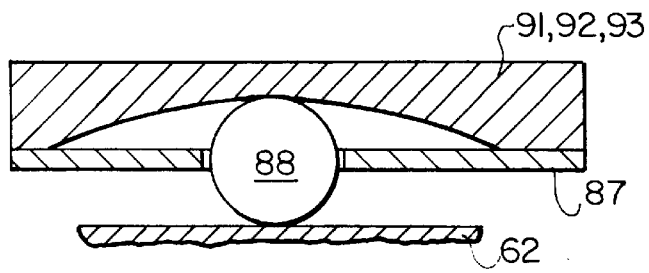
FIGS. 25 and 26 are side views of the operation of the cam unit of the present invention.

Grooves 91, 92 and 93 may be machine into raised hub 94 or be fabricated using any one of a variety of prior art techniques. A cross-section of representative groove 91, for example, is illustrated in FIG. 8. As shall be discussed below, a steel ball 88 rides within each crescent shaped groove and is retained from sliding from side to side by a guide plate 87 as shown in FIG. 25.

Cam 95 also include a mechanical stop 99 with limited the rotation of cam unit 6 to predetermined range.

FIG. 11 shows cam 95 mated to cam housing 31 in order to form cam unit 6. While mated, three holes 50, 51 and 52 are stepped drilled in corresponding grooves 91, 92 and 93, fully through cam 95 and into cam housing 31. FIG. 8 illustrates the cross-sectional view of each hole. Each hole has an upper diameter 82 of approximately 0.288 inches and a depth 83 of approximately 0.485 inches. Each hole also includes a step portion 84 having a diameter of approximately 0.187 inches and a length of approximately 0.10 inches.

Figure 6:
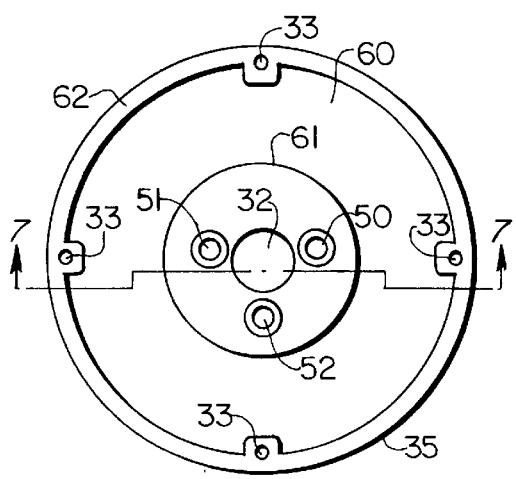
FIG. 6 is a further bottom view of the cam housing for the cam unit of the present invention showing additional fabrications details.
Figure 7:
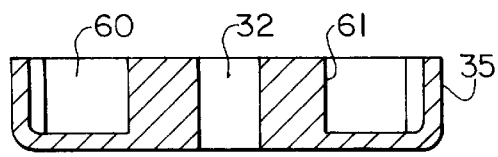
FIG. 7 is another cross-sectional view of the cam housing for the cam unit of the present invention as shown in FIG. 6.

After holes 50–52 are formed, cam 95 is separated from cam housing 31. The bottom surface of cam housing 31 (FIG. 5) is then further machined to form a circular cavity 60 around a center portion 61 of approximately 1.25 inches as shown in FIG. 6. The thickness of the outside wall 62 of cavity 60 is approximately 0.062 inches except in the area of screw holes 33 where the wall widens in order to provide sufficient strength for the holes as shown in FIG. 6. The thickness of bottom floor 70 of circular cavity 60 also is approximately 0.062 inches as shown in FIG. 7.

All or a portion of the outer surface 35 (FIGS. 6 and 7) of cam housing 35 may be knurled to provide a slip-resistant hand grip for manually rotating cam unit 6 as discussed below.

As shown in FIGS. 13 and 14, lower housing 7 is generally U-cup in construction and can be fabricated from aluminum as well. The inside diameter of lower housing 7 is slightly larger than the outside diameter of cam unit 6 so that cam unit 6 may be mated internally with lower housing 7 as shown in FIGS. 15 and 16. Lower housing 7 includes a threaded stud 37 which is received in a corresponding nut 38 in cam housing 31 located within bore 32 (FIG. 3). Stud 37 can be attached to the bottom wall 22 of lower housing 7. Stud 37 and nut 38 are used to hold cam unit 6 and lower housing 7 together.

As a part of the assembly process of mating cam unit 6 to lower housing 7, a roller ball 88 is inserted in each of grooves 91–93 (FIG. 9) and bears against release plate 62 as shown in FIG. 25.

Figure 17:
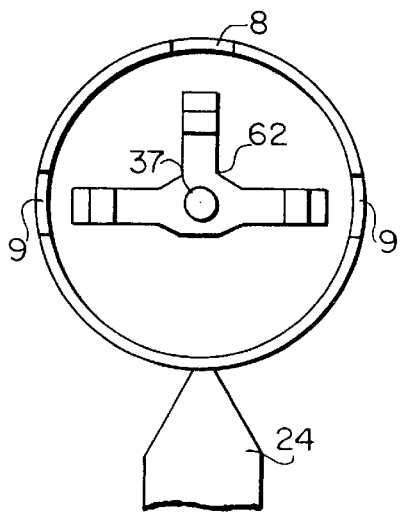
FIG. 17 is a top view of the lower housing of the automatic release buckle of the present invention showing the release plate which retains the belt clasp within the buckle.
Figure 18:
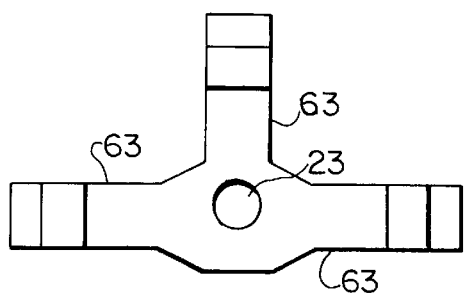
FIG. 18 is a top view of the release plate which retains the belt clasp within the buckle of the present invention.

Lower housing 7 contains release plate 62 as shown in FIGS. 15, 16 and 17. Also shown is belt 24 attached to lower housing 21. Release plate 62 is further illustrated in FIG. 18 and is used to latch and retain belt clasps which are inserted into the buckle at for, example, slots 8 and 9.

Release plate 62 can be formed of a flat metal plate of approximately 0.10 inches in thickness. The plate is fabricated into the shape shown in the top view in FIG. 18. In the embodiment illustrated in FIG. 18, three latch tangs 63 are provided so that as many as three safety belts can be attached to the buckle at the same time. Any number of latch tangs can be provided depending on the number of belts to be used with the buckle. Release plate 62 also includes a hole 23 through which stud 37 can pass.

Figure 19:
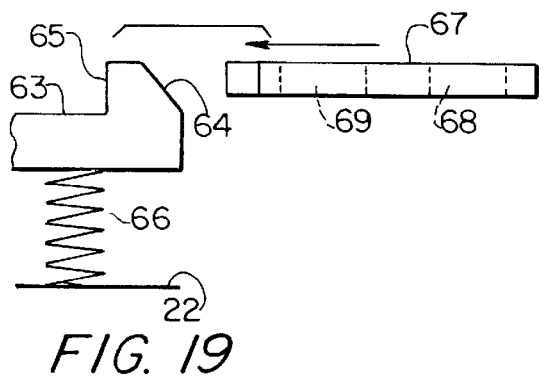
FIGS. 19–21 are partial side views of the release plate which retains the belt clasp within the buckle of the present invention and a side view of the belt clasp showing it being received by the release plate.
Figure 20:
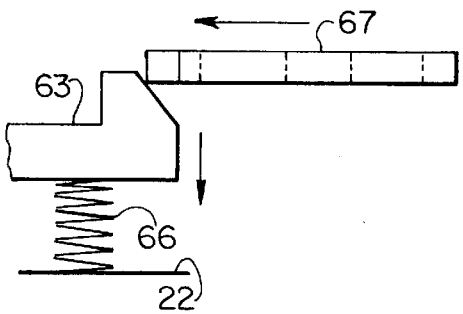
Figure 21:
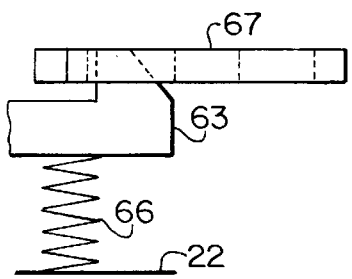

FIGS. 19–21 include a partial side view of the construction of tangs 63. As can be seen, each tang includes a deflection ramp 64, a latch shoulder 65 and a spring 66. One end of spring 66 is attached to the bottom wall 22 of lower housing 7 while the other end is attached to the bottom of the tang as shown.

Figure 22:
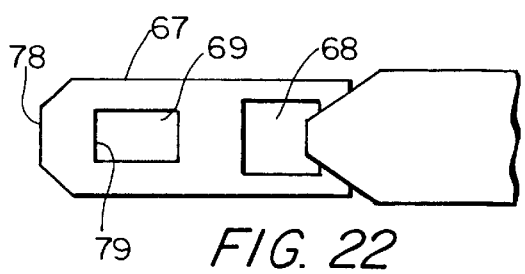
FIGS. 22 and 23 are top and side views, respectively, of the belt clasp.
Figure 23:
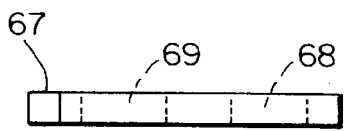

FIG. 22 illustrates one end of a safety belt 77 attached to a clasp 67 as known in the prior art. FIG. 23 is a side view of clasp 67. As FIGS. 22 and 23 show, clasp 67 has an opening 68 through which belt 77 is secured and a latch opening 69.

When clasp 67 is inserted in, for example, slot 9 of the buckle, forward end 78 of the clasp engages deflection ramp 64 of tang 63. See FIGS. 19 to 21. As clasp 67 is forced into slot 9, forward end 78 of clasp 67 rides along deflection ramp 64 forcing tang 63 in a downward direction against the force of spring 66. When clasp 67 has been inserted into slot 9 to a point where leading edge 79 of latch opening 69 clears shoulder 65, spring 66 rebounds, forcing tang 63 into latch hole 69 as shown in FIG. 21. Accordingly, the safety belt is latched into the buckle.

Figure 24:
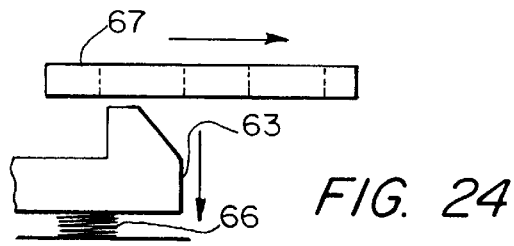
FIG. 24 is a side view of the release plate in its release position.

In order to release the belt, tangs 63 must be depressed as shown in FIG. 24. Clasp 67 can then be withdrawn. Deflection of tangs 63 is accomplished manually by rotating cam unit 7. The user grasp knurled portion 35 of cam housing 31 and rotates cam unit 7 in a clockwise or counter-clockwise direction as indicated by arrows 12 in FIG. 2.

Figure 26:
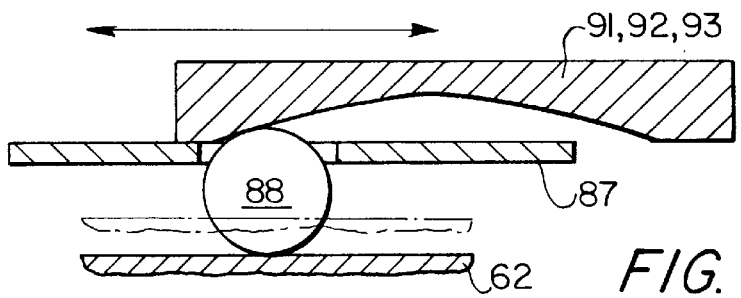

When cam unit 7 is rotated, the cam action on balls 88 in grooves 91, 92 and 93 converts the rotary motion of the cam to a vertical and linear motion on balls 88 as illustrated in FIG. 26. Balls 88, thus displace release plate 62 so that clasps 67 can be released as shown in FIG. 24.

Thus, tangs 63 are depressed by the operation of cam unit 7. Since balls 88 are at rest at the apogee of groove 91–93, the cam action will function in the same manner if cam unit 7 is rotated in a clockwise or counter clockwise direction.

Figure 27:
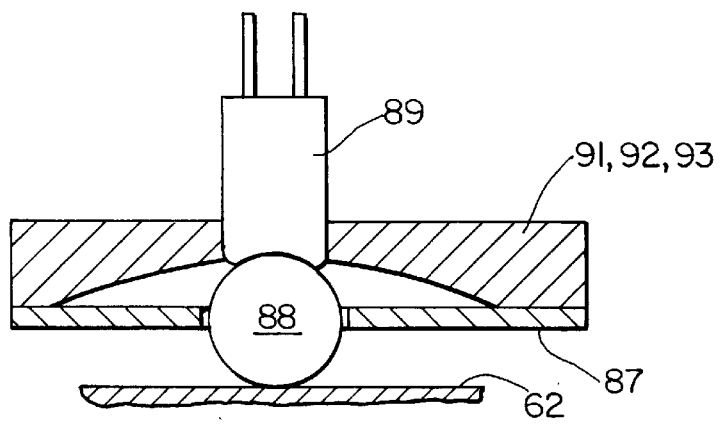
FIGS. 27 and 28 are side views of the operation of the cam unit of the present invention showing the use of electrically activated explosive devices to operate the release plate.

The above description describes the manual operation of the buckle. In order to provide for automatic release in a liquid, an electrically exploded device (EED) 89 is rigidly mounted in each of holes 50, 51 and 52 (FIG. 5) of cam unit 7 as illustrated in FIG. 27. When cam unit 7 is attached to lower housing 31, each EED 89 is positioned adjacent a corresponding ball 88 in grooves 91, 92 and 93.

An EED is an explosive device, which when activated sets off a small explosive charge. One example of such a device is known in the prior art as a so-called "dimple-motor".

Figure 29:
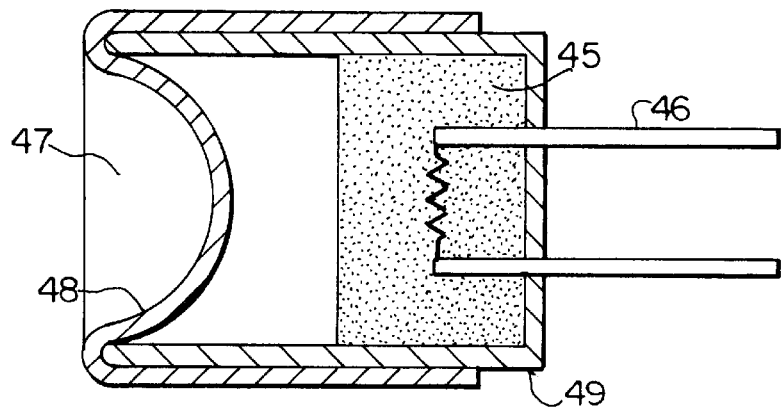
FIG. 29 is a cross-sectional view of an electrically activated explosive device.

A dimple motor is illustrated in cross-section in FIG. 29 and is formed of an explosive charge 45, a charge case 49, a bridge wire 46, a dimple area 47 and a dimple case 48. When bridge wire 46 is energized and charge 45 is fired, a high pressure is created behind dimple case 48 causing dimple 47 to invert. The inversion of dimple 47 causes a line force to be applied in the direction of the inversion.

Figure 28:
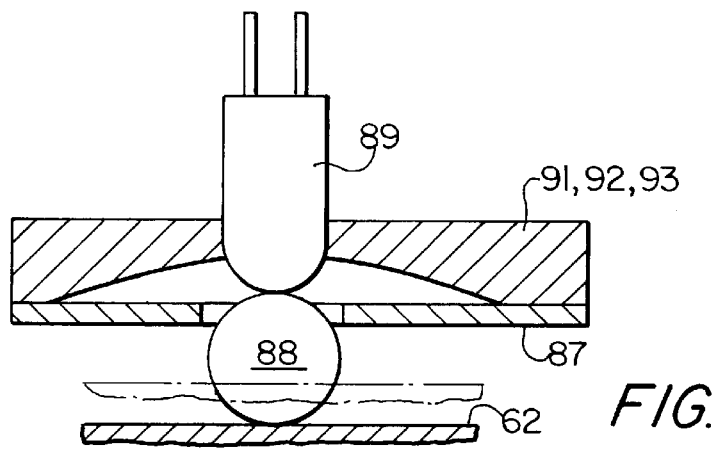

FIGS. 27 and 28 illustrate an EED 89 placed at the apogee of each of grooves 91–93. When the EEDs are activated by a liquid sensitive circuit, they induce the same vertical linear motion as the manual rotation of cam unit 7 on balls 88, thus, depressing release plate 62 as shown in FIG. 28 and releasing clasps 67. Also in this configuration, EEDs 89 do no interfere with the manual operation of cam unit 7.

Figure 30:
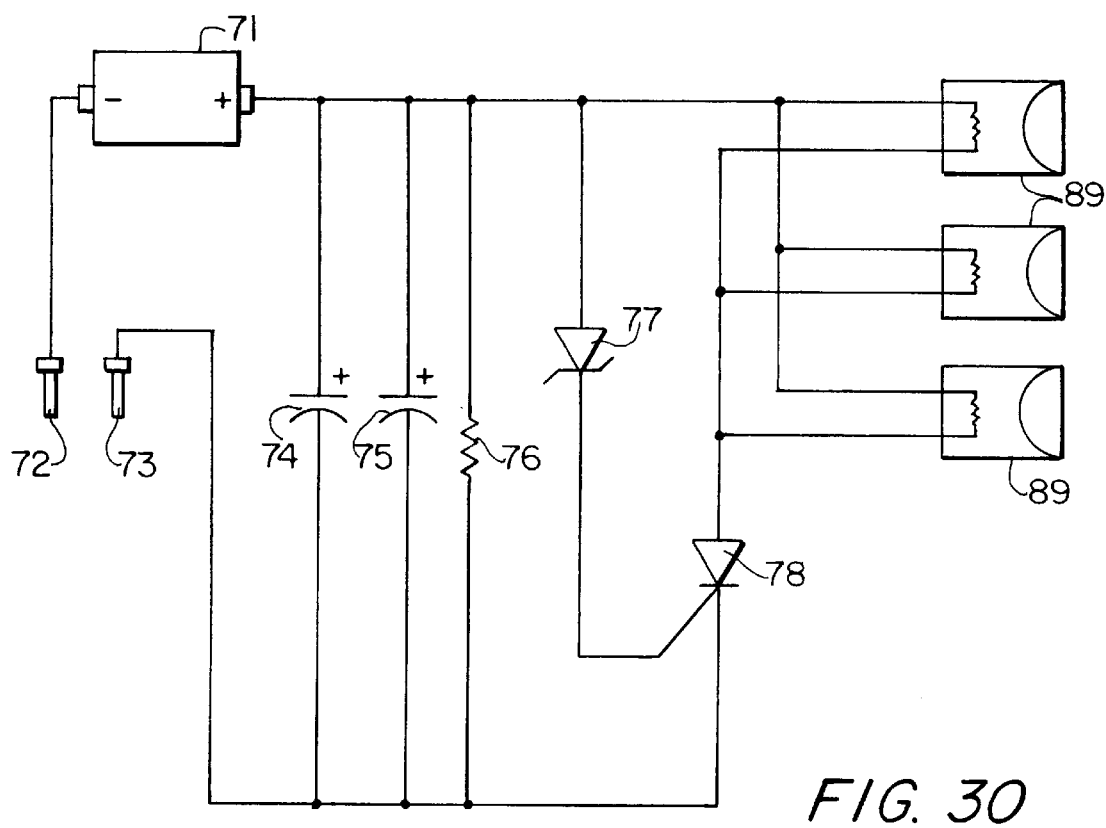
FIG. 30 is a schematic diagram of the liquid sensitive circuit used to control the activation of electrically activated explosive devices in accordance with the present invention.

The liquid activated circuitry utilized to activate EEDs 89 is shown in FIG. 30. This circuitry is located within an appropriate space within cam housing 31. When the buckle is submerged in liquid, for example, having a conductivity of 100 $\mu$mho's or higher, and the liquid bridges the gap between probes 72,73, capacitors 74,75 begin to charge. When the voltage level of the capacitors reach a level which is set by zener diode 77, a control current signal is applied to the gate terminal of SCR 78. This operation provides a slight time delay in order to avoid false triggering of EEDs 89.

When the voltage across capacitors 74,75 is at the proper level, the control current signal causes SCR 78 to conduct and the EEDs are activated, thus causing balls 88 to depress release plate 62 and release the belt clasps. Resistor 76 is used to bleed any voltage from capacitors 74,75 should probes 72,73 inadvertently be splashed with liquid.

Probes 72,73 are located on cam housing 31. FIGS. 31 to 36 illustrate the construction and placement of the probes.

Figure 31:
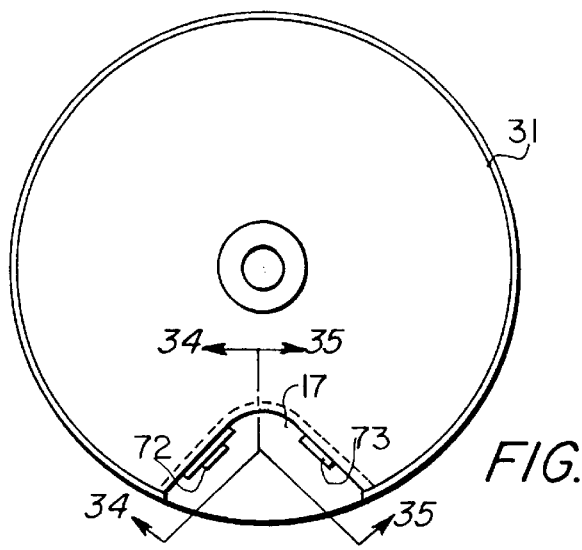
FIGS. 31–36 are various views of the location and construction of the probes for the liquid sensitive circuitry of the present invention.
Figure 32:
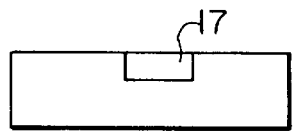

As shown in FIG. 31, cam housing 31 has a probe cavity 17 which is formed in a sidewall of the housing. FIG. 31 is a top view and FIG. 32 is a side view.

Figure 33:
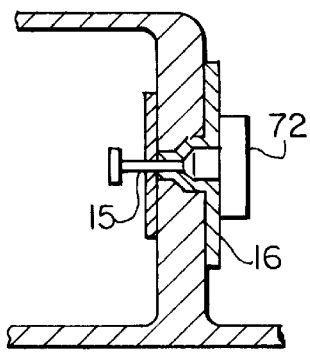
Figure 34:
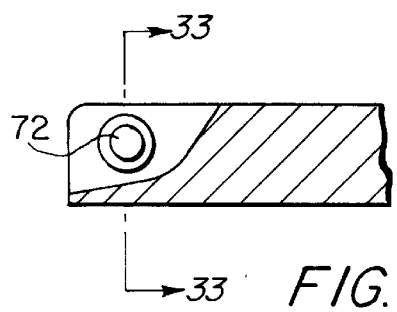

Probe 72 is gold plated and is formed in one side of the cavity as shown in FIGS. 33 and 34. Probe 72 is pressed into the side wall of cam housing 31 and is electrically insulated from the side wall by an insulator 16 which may be formed of nylon. The insulator also serves to reduce liquid droplet formation adjacent the probe.

As FIG. 33 illustrates, the inner end of probe 72 narrows to a neck portion 15 which reduces the effects of electromagnetic interference on the liquid sensitive circuitry. The inner end of probe 72 is connected to the negative terminal of battery 71 which supplies electrical power to the circuitry.

Figure 35:
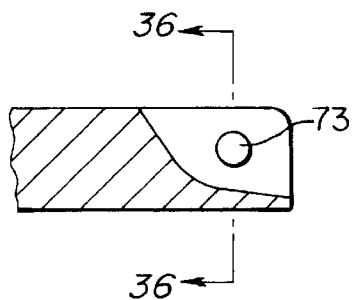
Figure 36:
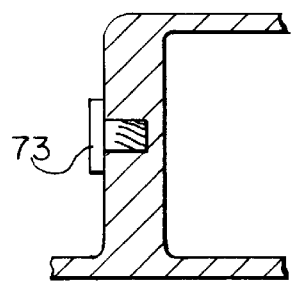
Figure 37:
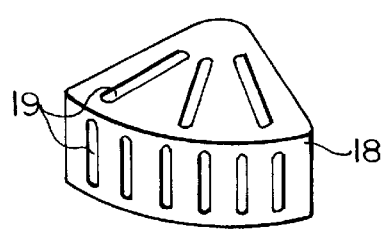
FIG. 37 illustrates the cover which covers the cavity in which the probes are located.

As illustrated in FIGS. 35 and 36, probe 73 is formed of stainless steel and is inserted into the other side of cavity 17. This probe is connected to the positive terminal of battery 71.

Cavity 17 is covered by a cover 18 which contain a plurality of openings 19. Cover 18 snaps into cavity 17 and can be held in place by a compression fit. Openings 19 allow the entrance of liquid to probes 72 and 73 when the buckle is submerged in liquid. The openings also allow the free flow of air through cavity 17 in order to avoid a build up of moisture on probe 72 and 73 and the attendant false sensing of the liquid sensitive circuitry.

Once EEDs 89 have been activated, they can be easily replaced by disassembling cam unit 6. Thus, the buckle can be easily reconditioned for further use.

FIG. 12 illustrates another embodiment of cam unit 7. In this embodiment, lower housing 7 is formed in the shape of a handle 97 which permits easy grasping by the user for rotating cam unit 7.

It should be obvious from the above-discussed apparatus embodiment that numerous other variations and modifications of the apparatus of this invention are possible, and such will readily occur to those skilled in the art. Accordingly, the scope of this invention is not to be limited to the embodiment disclosed, but is to include any such embodiments as may be encompassed within the scope of the claims appended hereto.

I claim:

1. A liquid-sensitive safety belt buckle, said buckle comprising:
   a latch for receiving and retaining one end of the clasp of a safety belt within said buckle, said latch including a shouldered tang, said clasp having an aperture through which said shouldered tang is received for retaining said safety belt;
   a release mechanism for releasing said latch in order to free said safety belt from said buckle, said release mechanism includes a rotary cam having a rotation axis about which it rotates to push said shouldered tang away from said aperture;
   a control device for controlling the operation of said release mechanism; and
   a liquid detection device for detecting the presence of liquid and providing a corresponding control signal to said control device when liquid is present, wherein said control device operates said release mechanism in response to said control signal to release said belt from said latch, wherein said control device operates along an axis which is offset from said rotation axis of said release mechanism.

2. A liquid-sensitive safety belt buckle according to claim 1, wherein said shouldered tang is held within said aperture by spring tension.

3. A liquid-sensitive safety belt buckle according to claim 2, wherein said latch includes a plurality of said shouldered tangs for receiving a corresponding plurality of said clasps having apertures through which respective said shouldered tangs are received.

4. A liquid-sensitive safety belt buckle according to claim 2, wherein said rotary cam when rotated pushes all of said shouldered tangs away from said apertures.

5. A liquid-sensitive safety belt buckle accordingly to claim 2, wherein said control device includes a displacement device for imparting movement to said release mechanism for releasing said latch in response to said control signal.

6. A liquid-sensitive safety belt buckle accordingly to claim 5, wherein said displacement device is an electrically activated explosive charge.

7. A liquid-sensitive safety belt buckle according to claim 1, wherein said liquid detection device includes a probe for interfacing said liquid detection device to the liquid.

8. A liquid-sensitive safety belt buckle accordingly to claim 7, wherein said liquid detection device include time delay means for delaying the generation of said control signal for a predetermined period of time when said liquid detection device detects the presence of liquid, said control signal being generated at the end of said delay.

9. A liquid-sensitive safety belt buckle, said buckle comprising:
   a latch for receiving and retaining one end of a safety belt within said buckle, said latch having a plurality of shouldered tangs and is adapted for receiving a safety belt having a plurality of clasps corresponding to said plurality of shouldered tangs, each of said clasps having an aperture through which a corresponding one of said shouldered tangs is received for retaining said safety belt, wherein said shouldered tangs are held within said aperture by spring tension;
   a release mechanism for releasing said latch in order to free said safety belt from said buckle;
   a control device for controlling the operation of said release mechanism; and
   a liquid detection device for detecting the presence of liquid and providing a corresponding control signal to said control device when liquid is present, wherein said control device operates said release mechanism in response to said control signal to release said belt from said latch; and
   wherein said control device includes a plurality of displacement devices formed with an electrically activated explosive charge for imparting movement to said release mechanism for releasing said latch in response to said control signal, each of said displacement devices corresponding to one of said shouldered tangs.

* * * * *